Nov. 4, 1941.   J. H. LEWIS   2,261,262
METHOD OF ROLLING SHEET GLASS
Filed Nov. 25, 1938
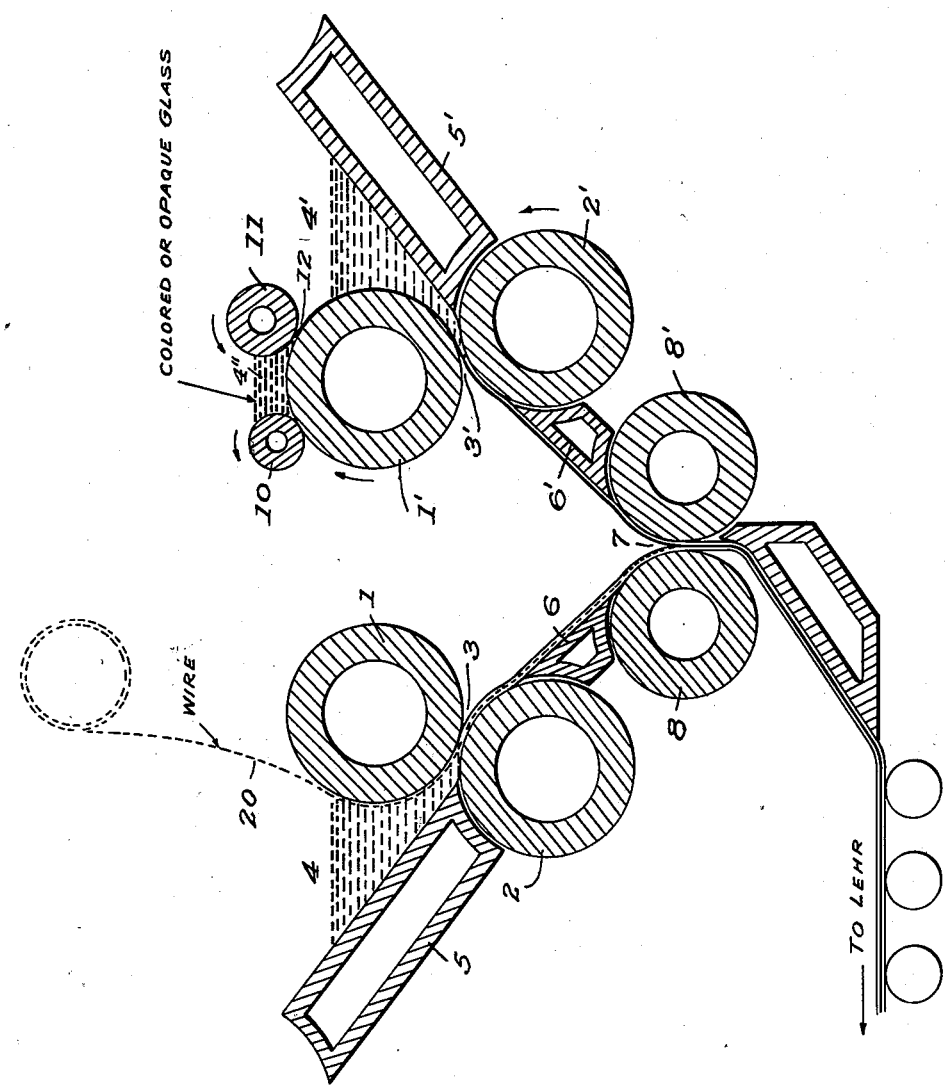
Inventor
JOSEPH H. LEWIS
By Dorsey Cole & Garner
Attorneys Patented Nov. 4, 1941

2,261,262

UNITED STATES PATENT OFFICE 2,261,262

METHOD OF ROLLING SHEET GLASS

Joseph H. Lewis, Kingsport, Tenn., assignor to Blue Ridge Glass Corporation, Kingsport, Tenn., a corporation of New York Application November 25, 1938, Serial No. 242,426

1 Claim. (Cl. 49—86)

U. S. Patent 1,801,689 to Pond discloses a machine for the manufacture of wire reenforced sheet glass in which the wire reenforcement is fed between two sheets of viscous hot glass which are then welded together in the pass between two rolls.

The present invention has for its end to flash one of the sheets of the prior patent with a glass of different characteristics prior to the insertion of the reenforcement, so that the finished product consists of three layers of glass with a wire reenforcement therein. Such a glass is described in my application filed as of even date herein, Serial No. 242,425, Compound glass sheets, and it is there pointed out that such a glass is desirable as a blackboard.

In the accompanying drawing, which represents a machine constructed in accordance with this invention, two pairs of rolls 1 and 2 and 1' and 2' with forming passes 3 and 3' respectively between them are shown. Adjacent to and above each forming pass is a reservoir 4 and 4' formed by the corresponding rolls 1 and 1', and tablets 5, 5'. Glass passing through the passes 3 and 3' is fed in sheet form over the aprons 6 and 6' and is delivered to a pass 7 between the rolls 8 and 8' whereby the two sheets, formed in the passes 3 and 3' are welded into a compound sheet. The above construction is shown in the Pond patent above referred to.

Located over the roll 1' are two rolls 10 and 11 on each side of the vertical axis of the roll 1', forming a reservoir which may be fed, for the purposes had in mind, with a colored or opaque glass. The rolls 10 and 11 rotate oppositely to the adjacent roll 1' whereby the escape of glass is prevented between such roll 1' and the roll 10. However, this direction of rotation of the roll 11 aids in feeding glass from the reservoir 4" through the pass 12 between the roll 11 and the roll 1'. The glass passing through such pass moves downwardly on and with the surface of the roll 1' through the reservoir 4' with the glass in such reservoir in contact with the exposed surface of the sheet formed at the pass 12 and finally issues through the pass 3' in contact with the roll 1' but separated from the roll 2' by a layer of glass formed from the glass in the reservoir 4'.

The above construction permits the layer to be formed from the glass 4" of small thickness.

Wire reenforcement 20 may be fed through the pass 3 together with glass from the reservoir 4 and, if so, the resultant compound sheet will consist of a central layer of glass formed from the glass furnished by the reservoir 4" having on each side a layer of glass furnished by the reservoirs 4 and 4' respectively, in one of which latter layers will be imbedded the wire reenforcement.

Having thus described my invention, what I claim and desire to secure by Letters Patent is:

The method of forming a sheet or plate of colored glass which consists in establishing a plurality of pools of molten glass, feeding the glass from each pool through an associated forming pass to form the glass into a ribbon, feeding a wire reinforcement through one of said pools and through its associated forming pass concomitantly with the glass passing therethrough, establishing a further pool of colored or opaque glass adjacent to and above one of said pools, feeding the colored glass from said last named pool through a forming pass of materially smaller cross section than that of said first named forming passes to form said colored glass into a ribbon, feeding the ribbon so formed through the adjacent pool and downwardly through its associated forming pass, leading the formed ribbons of glass downwardly and toward each other to a common forming pass and feeding the glass therethrough under pressure whereby said ribbons are welded to form an integral sheet or plate, and thereafter transporting said sheet or plate from the common forming pass to an annealing oven.

JOSEPH H. LEWIS.